United States Patent
Means

(10) Patent No.: US 11,743,180 B2
(45) Date of Patent: Aug. 29, 2023

(54) SYSTEM AND METHOD FOR ROUTING TRAFFIC ONTO AN MPLS NETWORK

(71) Applicant: AT&T Intellectual Property I, L.P., Atlanta, GA (US)

(72) Inventor: Israel Means, Chula Vista, CA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 82 days.

(21) Appl. No.: 17/100,237

(22) Filed: Nov. 20, 2020

(65) Prior Publication Data
US 2022/0166711 A1 May 26, 2022

(51) Int. Cl.
*H04L 45/50* (2022.01)
*H04L 45/02* (2022.01)
*G06F 9/455* (2018.01)
*H04L 45/741* (2022.01)
*H04L 45/586* (2022.01)

(52) U.S. Cl.
CPC ........ *H04L 45/507* (2013.01); *G06F 9/45558* (2013.01); *H04L 45/04* (2013.01); *H04L 45/586* (2013.01); *H04L 45/741* (2013.01); *G06F 2009/45595* (2013.01)

(58) Field of Classification Search
CPC ..... H04L 45/507; H04L 45/04; H04L 45/586; H04L 45/741; G06F 9/45558; G06F 2009/45595
See application file for complete search history.

(56) References Cited

U.S. PATENT DOCUMENTS

| | | | | |
|---|---|---|---|---|
| 7,486,659 | B1* | 2/2009 | Unbehagen | H04L 12/4633 370/395.31 |
| 8,953,590 | B1* | 2/2015 | Aggarwal | H04L 12/4675 370/409 |
| 10,027,587 | B1* | 7/2018 | O'Brien | H04L 45/745 |
| 10,142,128 | B2* | 11/2018 | Guichard | H04L 63/0272 |
| 10,333,853 | B1* | 6/2019 | Seshadri | H04L 45/20 |
| 10,454,821 | B2* | 10/2019 | Filsfils | H04L 45/74 |
| 10,491,720 | B2* | 11/2019 | Brissette | H04L 45/74 |
| 10,742,557 | B1* | 8/2020 | Miriyala | H04L 49/70 |
| 11,233,741 | B1* | 1/2022 | N | H04L 45/66 |
| 2001/0049739 | A1* | 12/2001 | Wakayama | H04L 49/354 709/230 |
| 2003/0118026 | A1* | 6/2003 | Kuhl | H04L 47/2491 370/395.21 |
| 2005/0021789 | A1* | 1/2005 | Iloglu | H04L 63/0272 709/229 |
| 2008/0080509 | A1* | 4/2008 | Khanna | H04L 45/00 370/392 |
| 2008/0170578 | A1* | 7/2008 | Ould-Brahim | H04L 12/4641 370/401 |

(Continued)

*Primary Examiner* — Kyaw Z Soe
(74) *Attorney, Agent, or Firm* — GUNTIN & GUST, PLC; Robert Gingher

(57) ABSTRACT

A method includes sending a request for services from a Virtual Machine (VM) in an external cloud network to a provider multi-protocol label switching (MPLS) network, establishing a multi-protocol border gateway protocol (MP-BGP) session between the provider MPLS network and the external cloud network, exchanging control plane updates between the provider MPLS network and the cloud network and processing paths between the provider MPLS network and the remote VM.

20 Claims, 13 Drawing Sheets

(56) References Cited

U.S. PATENT DOCUMENTS

| | | | |
|---|---|---|---|
| 2009/0106449 A1* | 4/2009 | Satterlee | G06Q 30/02 709/238 |
| 2009/0168666 A1* | 7/2009 | Unbehagen | H04L 45/52 370/254 |
| 2010/0008361 A1* | 1/2010 | Guichard | H04L 45/50 370/392 |
| 2012/0069847 A1* | 3/2012 | Saad | H04L 45/50 370/392 |
| 2015/0003458 A1* | 1/2015 | Li | H04L 45/507 370/392 |
| 2015/0109902 A1* | 4/2015 | Kumar | H04L 45/22 370/219 |
| 2015/0381493 A1* | 12/2015 | Bansal | H04L 45/745 370/392 |
| 2016/0006672 A1* | 1/2016 | Saavedra | H04L 49/00 370/401 |
| 2017/0026233 A1* | 1/2017 | Boutros | H04L 41/0816 |
| 2018/0351882 A1* | 12/2018 | Jeganathan | H04L 45/02 |
| 2019/0132280 A1* | 5/2019 | Meuninck | H04L 69/325 |
| 2020/0127913 A1* | 4/2020 | Filsfils | H04L 45/04 |
| 2020/0296025 A1* | 9/2020 | Wang | H04L 45/28 |
| 2020/0296033 A1* | 9/2020 | Hill | H04L 45/50 |
| 2021/0112034 A1* | 4/2021 | Sundararajan | H04L 63/0263 |
| 2021/0135986 A1* | 5/2021 | Song | H04L 45/507 |
| 2021/0203599 A1* | 7/2021 | Guichard | H04L 45/745 |
| 2021/0306260 A1* | 9/2021 | Watts | H04L 45/04 |
| 2021/0306338 A1* | 9/2021 | Miriyala | H04L 63/101 |

* cited by examiner

SYSTEM AND METHOD FOR ROUTING TRAFFIC ONTO AN MPLS NETWORK

TECHNICAL FIELD

This disclosure is directed to systems and methods for routing traffic into an MPLS Network from a cloud network.

BACKGROUND

Multiprotocol Label Switching (MPLS) networks have become ubiquitous in telecommunications networks. MPLS networks are complex and replete with various routing protocols, such as border gateway protocol (BGP), label distribution protocol (LDP), open shortest path first (OSPF) protocols, among others, to function properly.

Connecting external cloud networks into an MPLS network typically requires an edge router of an MPLS network to process incoming BGP updates and data packets to reformat them into an MPLS format. Integrating virtual private network (VPN) services to an edge network requires a service instance, also known as a virtual routing and forwarding (VRF) context, on the edge device. The VRF acts as a closed routing instance and MPLS interface to the core network. However, the VRF must be provisioned in advance which eliminates or restricts the ability to dynamically add a service in accordance with on-demand methodologies. Moreover, the connections to VRFs must be provisioned as well, further reducing the availability of on-demand services. Although VRFs are necessary network artifacts when connecting to non-cloud networks, when connecting to cloud services, VRFs are often a barrier to rapid network availability.

There is a need for cost efficient systems and methods to dynamically route traffic onto cloud based MPLS networks.

SUMMARY

The disclosure is directed to a method including sending a request for services from a remote Virtual Machine (VM) in an external cloud network to a multi-protocol label switching (MPLS) network, establishing a multi-protocol border gateway protocol (MP-BGP) session between the MPLS network and the external cloud network, exchanging control plane updates between the MPLS network and the cloud network wherein the control plane updates include mapping of an MPLS label to an extension header, and processing paths between the MPLS network and the remote VM. The processing paths step may include receiving route information for the MP-BGP session into a virtual routing and forwarding (VRF) context, wherein the route information has the extension header appended thereto, encoding a data packet with the extension header appended thereto, mapping the extension header to the MPLS label, and routing the data packet to a remote processor in the MPLS network in accordance with the MPLS label. The MP-BGP session may be established between an MPLS edge processor and a cloud edge processor. The receiving the MP-BGP route information step may be based on receipt of an advertisement published by the MPLS edge processor. The mapping of the extension header to the MPLS label may be accessible by the MPLS edge processor.

The disclosure is also directed to a method including receiving, at a multi-protocol label switching (MPLS) network, a request for services from a Virtual Machine (VM) in an external cloud network, establishing a multi-protocol border gateway protocol (MP-BGP) session between the MPLS network and the external cloud network, exchanging control plane updates between the MPLS network and the cloud network, sending MP-BGP session updates and next hop routing information to an MPLS edge processor in the MPLS network, and advertising the MP-BGP session updates to the external cloud network. The control plane updates may include replacing an MPLS label with an extension header to form a modified MP-BGP header. The method may further include maintaining a correlation map between the MPLS label and the extension header. In an aspect, the method may further include receiving data associated with the extension header from the VM at the MPLS edge processor, replacing the extension header with the MPLS label, and routing the data to a remote processing element in the MPLS network based on the MPLS label. The method may further include receiving data from the remote processing element at the MPLS edge processor, replacing the MPLS label with the extension header and advertising the modified MP-BGP header to a cloud edge router in the cloud network for routing to the VM. The MP-MGB session updates may be sent from a remote processing element in the MPLS network to the MPLS edge processor. In an aspect, the method may further include sending internet protocol version 6 (IPv6) updates from the edge processor to the VM and establishing a non-MPLS connection between the MPLS edge processor and a cloud edge router associated with the external cloud network.

The disclosure is also directed to a system including a multi-protocol label switching (MPLS) network having a remote processing element, an MPLS network edge processor in communication with the remote processing element, wherein the MPLS network edge processor has an input-output interface, a processor coupled to the input-output interface wherein the MPLS network edge processor may be further coupled to a memory, the memory having stored thereon executable instructions that when executed by the MPLS network edge processor cause the MPLS network edge processor to effectuate operations including: receiving a request for services from a Virtual Machine (VM) in an external cloud network, establishing a multi-protocol border gateway protocol (MP-BGP) session between the MPLS network and the external cloud network, exchanging control plane updates between the MPLS network and the cloud network, sending MP-BGP session updates to an edge processor in the MPLS network along with next hop routing information, and advertising the MP-BGP session updates to the external cloud network. The operations further may further include replacing an MPLS label with an extension header, receiving data associated with the extension header from the VM, replacing the extension header with the MPLS label, and routing the data to the remote processing element. The operations may further include receiving data from the remote processing element, replacing the MPLS label with an extension header, and advertising the modified MP-BGP header to a cloud edge router in the cloud network for routing to the VM. In an aspect, the operations may further include receiving the MP-MGB session updates from a virtual routing and forwarding (VRF) context from the remote processing element. In an aspect, the operations may further include sending internet protocol version 6 (IPv6) updates to the VM. In an aspect, the operations further may include establishing a non-MPLS connection with a cloud edge router associated with the external cloud network. In an aspect, the operations may further include maintaining a correlation map between the MPLS label and the extension header.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
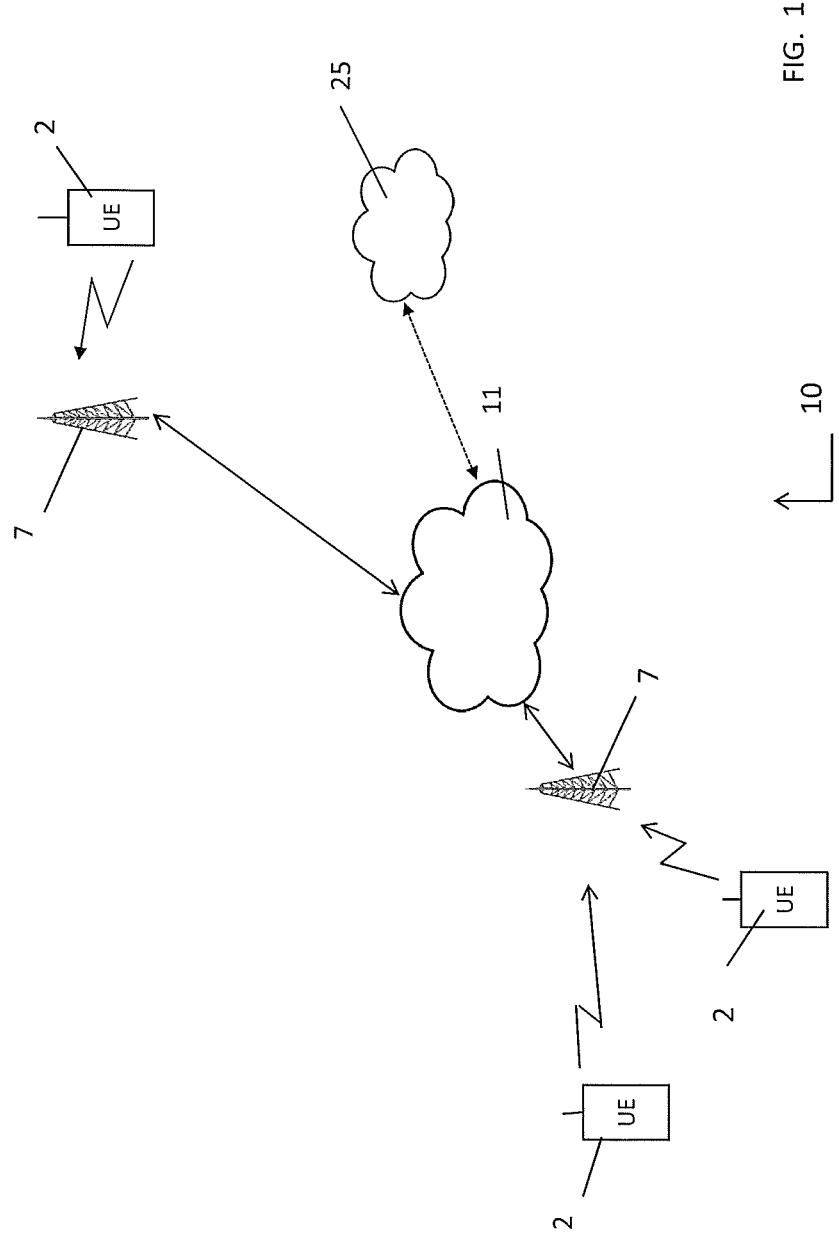
FIG. 1 illustrates an exemplary architecture for a system constructed in accordance with the present disclosure.

List of Acronyms: Unless otherwise specified, acronyms used in this application refer to the following definitions:
BGP—Border Control Protocol
LDP—Label Distribution Protocol
MPLS—Multiprotocol Label Switching
MP-BCG—Multiprotocol Border Control Protocol
OSPF—Open Shortest Path First
PE—Provider Edge Router
SDN—Software Defined Network
VM_Virtual Machine
VPN—Virtual Private Network
VRF—Virtual Routing and Forwarding System Overview. This disclosure is directed to a novel system and method for routing traffic onto an MPLS network. As such, it advances the state of telecommunications and network technological arts and provides a practical application for the systems and method described herein.

MPLS protocols such as Label Distribution Protocol (LDP), Open Shortest Path First (OSPF), Border Gateway Protocol-Labelled Unicast (BGP-LU) are typically not extended to the cloud networks. In accordance with an embodiment, the systems and methods of the present disclosure removes the Virtual Routing and Forwarding (VRF) protocol from the edge router for cloud connections. This is achieved by transitioning the cloud network from an external entity to an extension of the MPLS network.

A standard Multiprotocol-Border Gateway Protocol (MP-BGP) session between the network cloud and the provider edge (PE) router with IPv6 is used. Control plane updates are exchanged between the cloud and provider network using MP-BGP. There may be remote PEs within the provider network that run a fully implemented MPLS network protocol and which will send MP-BGP updates to the provider edge router that interfaces with the cloud network. The edge PE may then process paths from remote PEs in accordance with the following process:

Learn MP-BGP with update with VPN Label (V1) and PE label (L1).

The edge PE router replaces VPN and PE labels with an extension header value such as E1.

The modified MP-BGP update is advertised to the cloud.

A VM within the cloud having the corresponding remote terminal (RT) will import the MG-BGP route into its VRF context.

The VM will encode packets to the edge with extension header E1.

Upon learning packets with extension header E1, the edge PE router will invoke its MPLS mapping structure to determine which native MPLS label maps to extension header E1. In an example, L1 and V1 are mapped to E1.

MPLS labels L1 and V1 are pushed onto the packet and forwarding to the core for MPLS routing to the remote PE within the provider network.

Operating Environment. The system and method provided herein allows for the efficient onboarding of data onto an MPLS network. The network 11 may be an Internet Protocol/Multiprotocol Label Switching (IP/MPLS) converged network, and may, for example, include virtual private network (VPN) access points, Wi-Fi access points and any other access points capable of interfacing with the network 11. The network 11 may be a software defined network (SDN) configured in a cloud environment in which virtual network functions (VNF) may be instantiated on an "as needed" basis. An exemplary detailed description of a software defined network is set forth below with reference to FIGS. 10-13. For the purposes of this disclosure, the network 11 will be described in the context of an MPLS network.

The network 11 may be configured to provide edge resources for distributed, lower latency and higher throughput applications. This may, for example, be useful in 5G networks. There is also shown multiple user equipment (UE) 6 which are in communication with network 11 through cellular towers 7. There is also shown an external cloud network 25 which may, for example, be a customer or partner network such as the Amazon Web Services (AWS) cloud which are in communication with the network 11. The disclosure will describe the communications between the cloud network 25 and the MPLS network 11. The MPLS network 11 may also be referred to as the "provider network" or the "provider MPLS network" for the purposes of this disclosure. "Edge PE" or "provider edge PE" or "provider edge router" will be used interchangeably and refers to the processing element that interfaces directly to the cloud network. It will be understood that the disclosure describes a single edge PE in communication with a cloud network, however that configuration is exemplary only and there may be multiple provider edge routers connecting to multiple cloud networks or multiple cloud edge routers within any particular cloud network.

Figure 2:
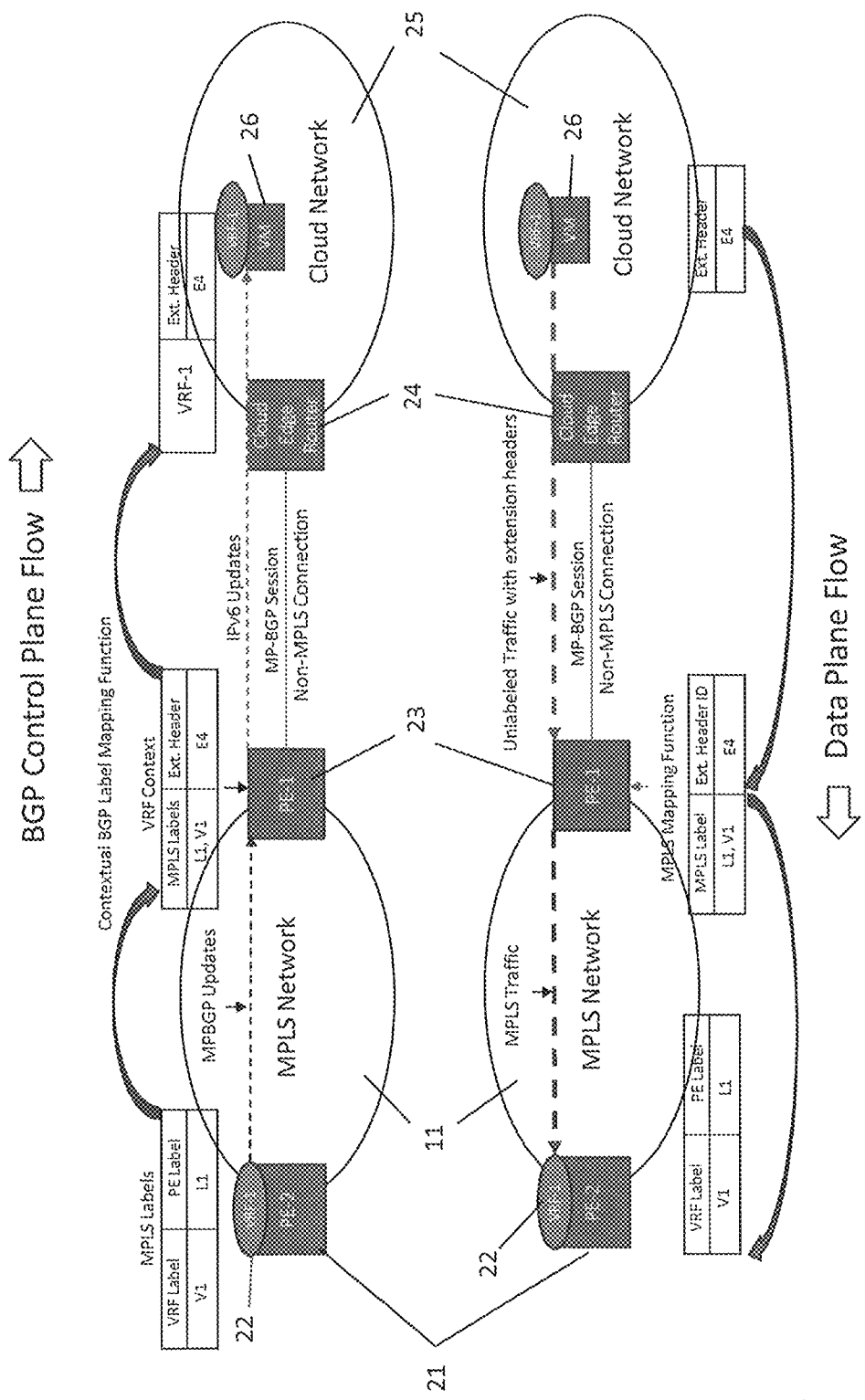
FIG. 2 illustrates exemplary control plane and data plane flows between an MPLS network and a cloud network.

With reference to FIG. 2, there is shown an exemplary call flow diagram in two portions, with the top portion showing the BGP control plane flow to route traffic from an external cloud network 25 onto the MPLS network 11 and the bottom portion showing the data plane flow from the cloud network 25 onto the MPLS network 11. This exemplary flow is also described with reference to FIGS. 4 and 5 below.

With respect to the top portion of FIG. 2, provider remote PE-2 22 advertises a standard MP-BGP update having a label L1 and a VRF label of V1 to next hop destination provider edge router PE-1. PE-1 may then modify the MP-BGP by PE-1 23. This update may, for example update the labels before advertising to the cloud network edge router 24 by stripping the VRF label V1 and PE-2 21 label L1 in the VRF context and appending extension header E4. This provides a contextual BGP label mapping function. PE-1 23 will create a local mapping context in a database linking the PE-2 22 MPLS labels to extension header E4 which will serve as reverse mapping for data from the cloud network 25 to the provider network 11. Provider edge router PE-1 23 then advertises the BP-BGP update to cloud edge router 24 with a destination of VM with VRF-1. The MP-BGP session may then be extended to the cloud edge router 24 through the establishment of an MP-BGP session. This will not be a typical MPLS connection. The VRF context may be passed through the cloud edge router 24 using in IPv6 protocol to a virtual machine (VM) 26 running on the cloud network 25. The VRF context may them be established by reapplying the VRF-1 label and the extension header E4 to the VM 26 instance. In accordance with the foregoing, a control plane has been established between the cloud network 25 and the MPLS network 11, with VRF-1 reestablished and an extension header of E4 replacing the MPLS label L1 and the VRF label V1. This then may activate the data plane flow in the bottom portion of FIG. 2.

The data flow may go from VM-26 in the cloud network 25 to the MPLS network 11 through cloud edge router 24 and provider edge router PE-1 23 to the destination remote processor PE-2 22. VM 26 may encode packets destines to VRF-1 on PE-2 22 with extension header E4. The MP-BGP session (a non-MPLS connection) may be established between the cloud edge router 24 and provider edge router PE-1 23. PE-1 23 will learn the extension header E4 and map the extension header E-4 back to the MPLS labels L1 (for the PE label) and V1 (for the VRF label) and convert the traffic to MPLS traffic. This restores VRF-1 (VRF label V1) and the PE label L1 to the data at remote PE-2 21 in the MPLS network 11. In accordance with the foregoing, traffic from the cloud network 25 may efficiently be routed onto the MPLS network 11.

Figure 3:
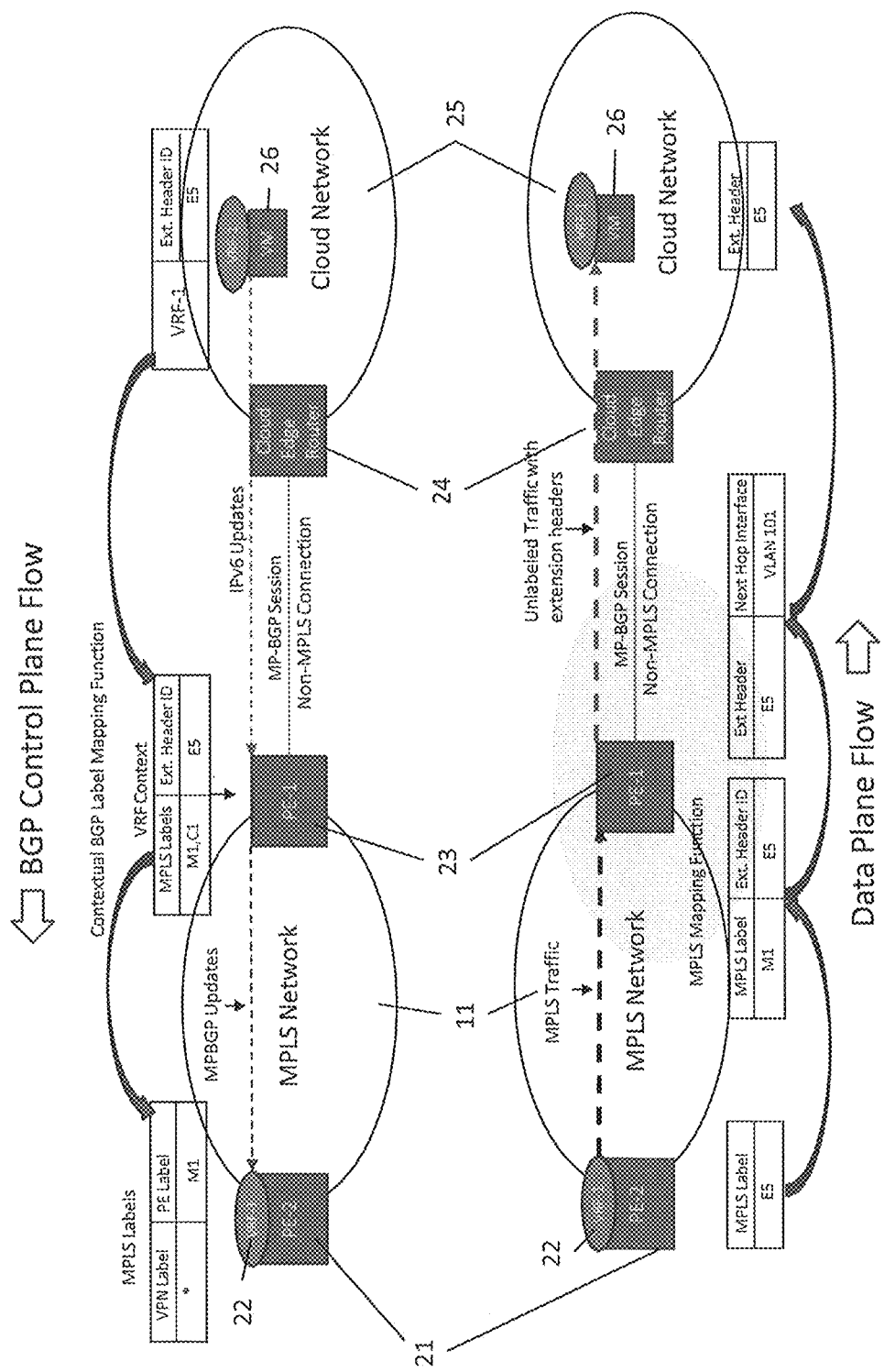
FIG. 3 illustrates an exemplary control plane and data flows from cloud network and an MPLS network.

With reference to FIG. 3, there is shown an exemplary reverse process showing the routing of traffic from the MPLS network 11 onto a cloud network 25 with the top portion being transmission of a BGP control plane from the cloud network 25 as modified to interact with the MPLS network 11 and the lower portion being the routing of data traffic from the MPLS network 11 to the cloud network 25.

With respect to the BGP control plane flow, in this example, a VM 26 with a VRF-1 label has an extension header E5 added and the VRF designation deleted at the cloud edge router 24. An MP-BGP session may be established to PE-1 23 using IPv6 updates. Provider edge router PE-1 22 may recreate the VRF context by carrying through the extension header E5 and adding MPLS labels M1 and C1 as MPLS labels. Once on the MPLS network 11, the control plane provides MP-BGP updates to the provider network 11 remote processor PE-2 21 where the VRF-1 designation 22 is re-attached. At remote processor PE-2 22, there is at least PE label M1 attached. The mapping of extension header E5 and MPLS label M1 may be maintained by provider edge router PE=1 22.

Turning now to the bottom portion of FIG. 3, there is shown an exemplary data flow diagram whereby data being processed by the remote processor PE-2 22 in the MPLS provider network 11 is routed to the cloud network 25. VRF-1 with MPLS label M1 is forwarded to provider edge router PE-1 23, where MPLS label M1 is mapped to extension header E5 with next hop instructions to interface VLAN 101. The unlabeled traffic with extension headers is routed over the modified MP-BGP session using a non-MPLS connection to the cloud edge router 24. The MPLS mapping function maps MPLS label M1 and extension header E5 to VRF-1 at VM 26.

Figure 4:
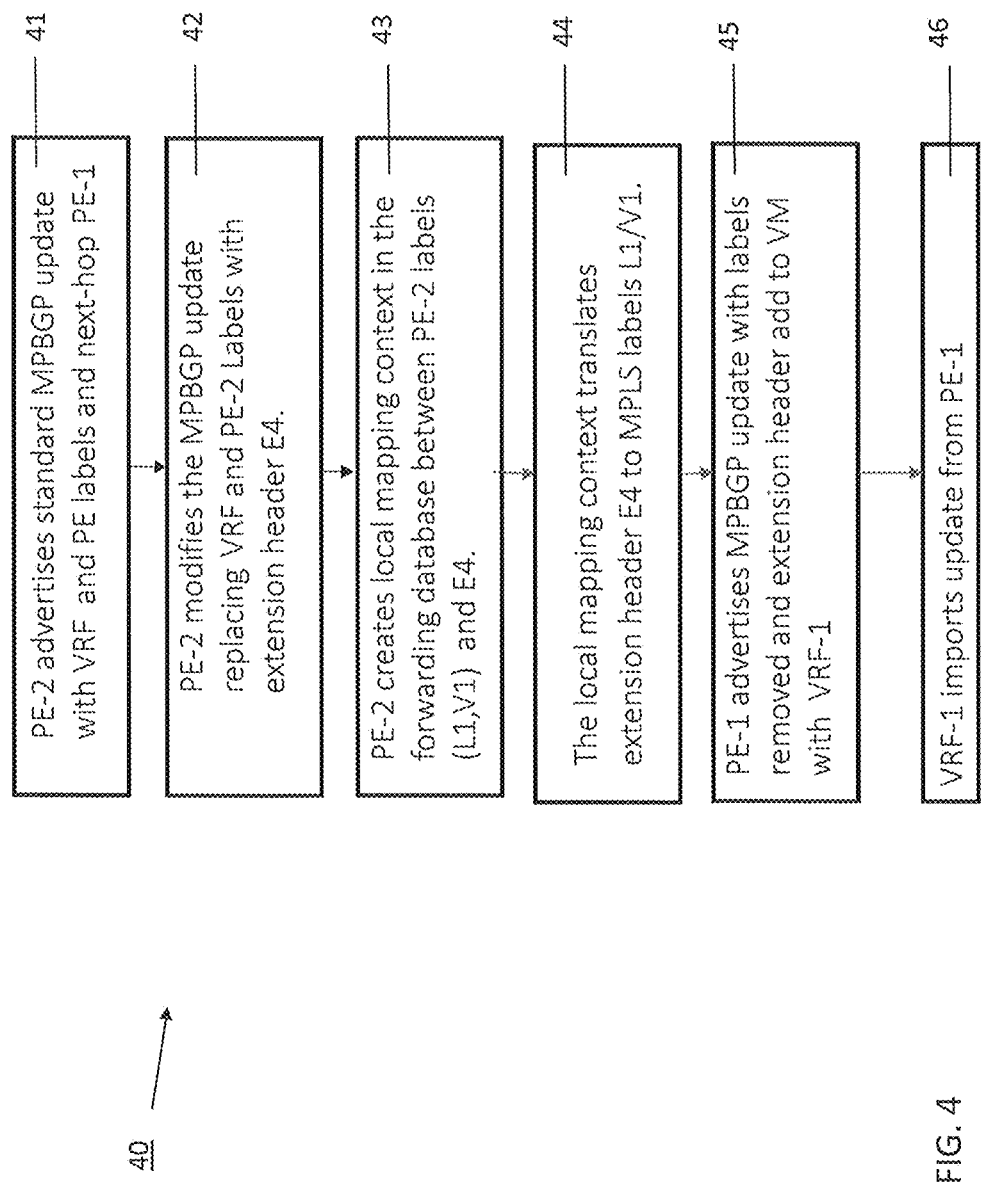
FIG. 4 illustrates an exemplary method in accordance with the flow diagrams of FIG. 2.

Methods of Use. With reference to FIG. 4 and FIG. 2, there is shown an exemplary control flow diagram 40 corresponding to the establishment of a control plane of an MP-BGP session between a provider network and a cloud network. At 41, PE-2 22 advertises the standard MP-BGP update with VRF and PE labels and the next-hop PE-1. At 42 PE-2 22 modifies the MP-BGP update by replacing the VRF and PE-2 labels with extension header E4. At 43, PE-2 22 creates a local mapping context in a forwarding database that maps and replaces the PE-2 22 labels identified as L1, V1 in FIG. 2 with extension header E4. Such local mapping context will be used to translate extension header E4 to MPLS labels L1 and V1 in the data plane. At 45, PE-1 23 advertises the MP-BGP update to the cloud network 25 with the MPLS labels L1 and V1 removed and extension header E4 added for routing to VM 26 with VRF-1. At 46, VRF-1 imports the MP-BGP update from PE-1 23.

Figure 5:
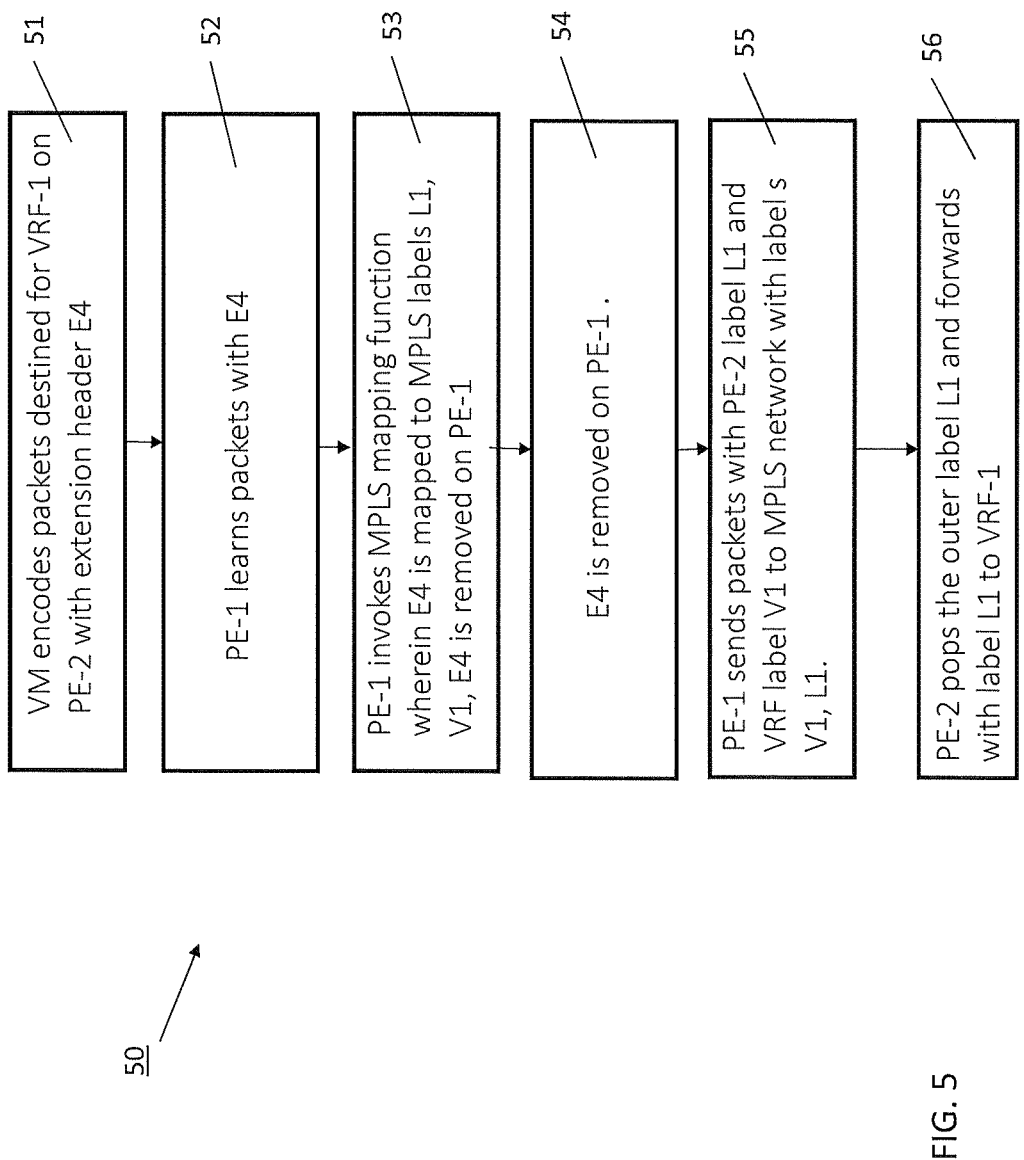
FIG. 5 illustrates an exemplary method in accordance with the flow diagrams of FIG. 2.

With reference to FIG. 5 and FIG. 2, there is shown an exemplary data flow diagram 50 from the cloud network 25 to the provider network 11. At 51 VM 26 encodes packets destined to VRF-1 on remote processor PE-2 21 with the extension header E4. At 52, provider edge router PE-1 23 receives packets with the extension header E4. At 53 PE-1 23 invokes its MPLS mapping function whereby extension header E4 is mapped to and replaced with MPLS labels L1, V1. At 54, extension header E4 is removed on PE-1 23, At 55 PE-1 sends packets with PE-2 label L1 and VRF label V1 to the MPLS network for forwarding to remote processor PE-2 22. At 56, upon learning packets from MPLS network 11 with labels V1, L1. PE-2 22 pops the outer label (L1) and forwards with label V1 to VRF-1.

Figure 6:
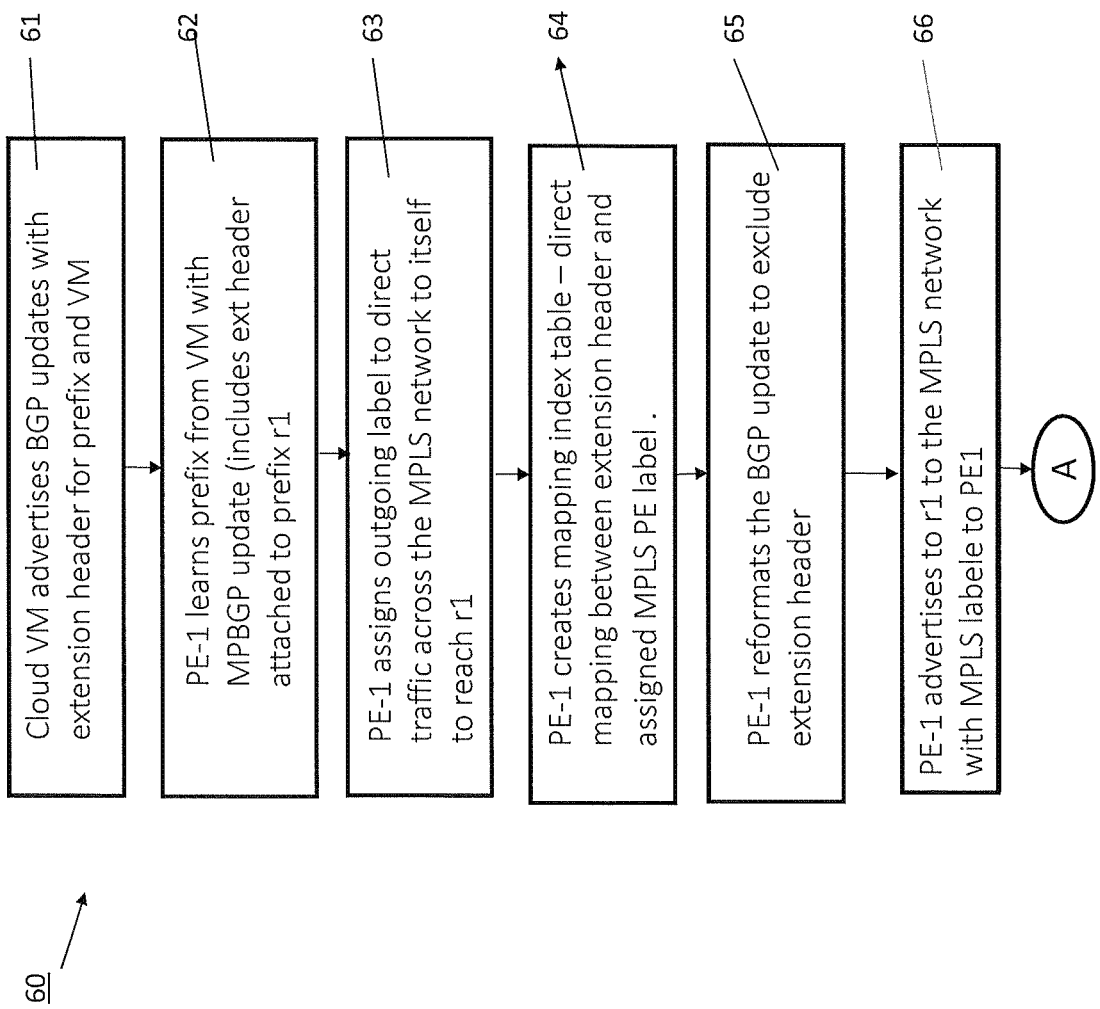
FIG. 6 illustrates an exemplary method in accordance with the flow diagrams of FIG. 3.

With respect to FIG. 6 and FIG. 3, there is shown an exemplary control plane flow diagram 60. At 61 VM 26 in the cloud 25 advertises MP-BGP updates with extension header 5 associated with that VM 26. At 62, PE-1 23 learns the prefix from VM 26 via the MP-BGP update which includes extension header 5 attached to the prefix (r1). Prefix r1 is a standard internet protocol version 4 (IPv4) or internet protocol version 6 BGP advertisement with a segment routing IPv6 extension header. At 63, PE-1 23 assigns an outgoing label to direct traffic across the MPLS network to itself in order to reach the r1. At 64 PE-1 23 creates a mapping index table that builds a direct mapping between extension header E5 the assigned MPLS labels M1, C1. At 65, PE-1 23 reformats the MP-BGP update to exclude the extension header E5. PE-1 23 advertises r1 to the MPLS network 11 with the MPLS label to PE2 21. The process continues at A.

Figure 7:
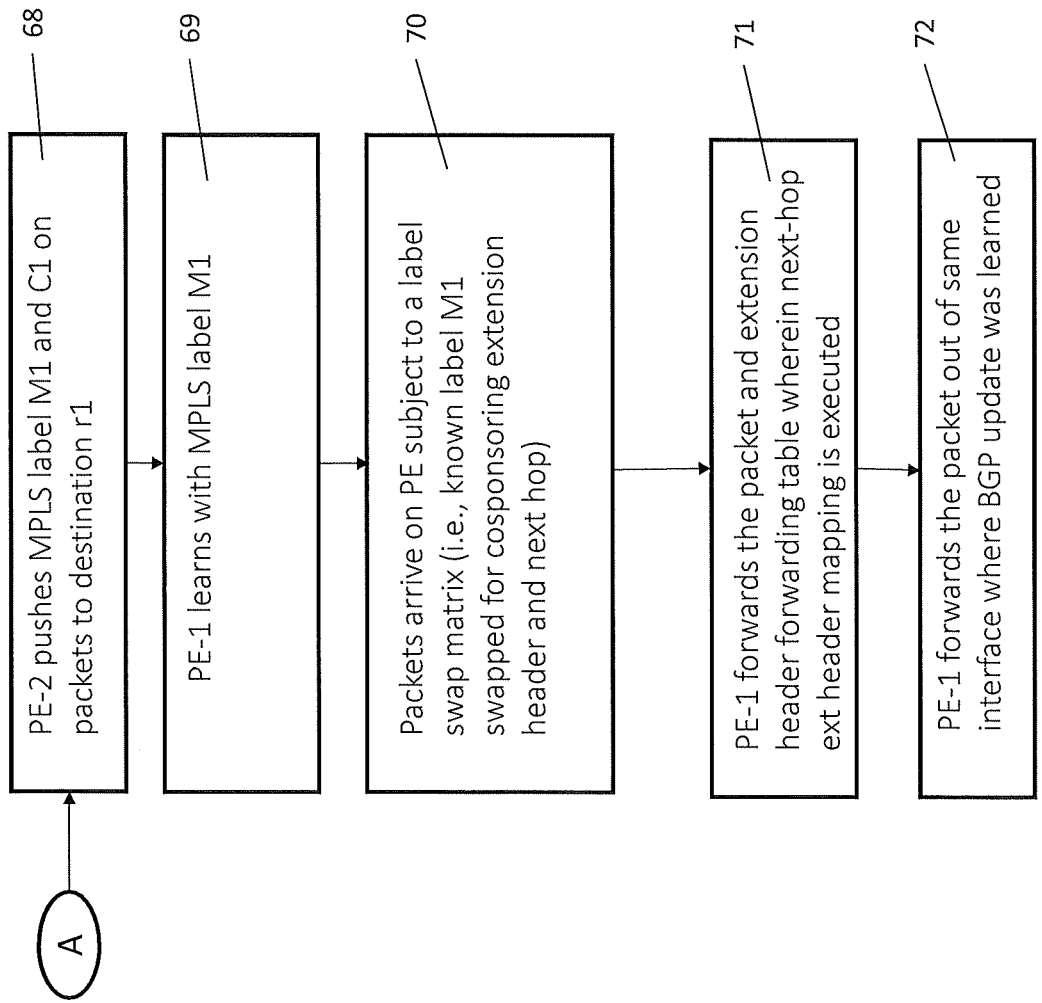
FIG. 7 illustrates an exemplary method in accordance with the flow diagrams of FIG. 3.

With respect to FIG. 7 and FIG. 3, the process moves from A at 68 wherein PE-2 21 pushes MPLS Label M1 and C1 onto packets to destination r1. At 69, PE-1 23 learns with MPLS label M1. At 70, packets received on PE-1 23 are subject to the label swap matrix. When the known label (M1) is found it swaps it for the cosponsoring extension header and next hop. At 71 PE-1 23 forwards the packet and the extension header forwarding table wherein the next-hop extension header mapping is executed. At 72, PE-1 23 forwards the packet out of the same interface where the BGP update was learned.

Figure 8:
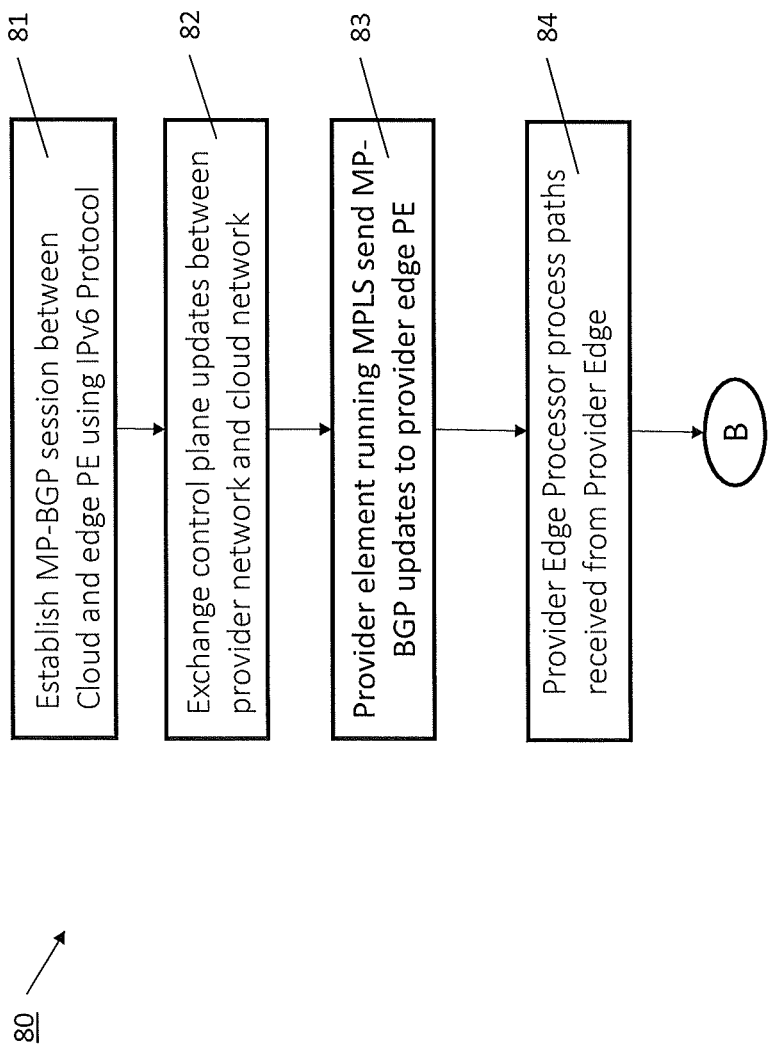
FIG. 8 illustrates an exemplary method in accordance with the present disclosure.
Figure 9:
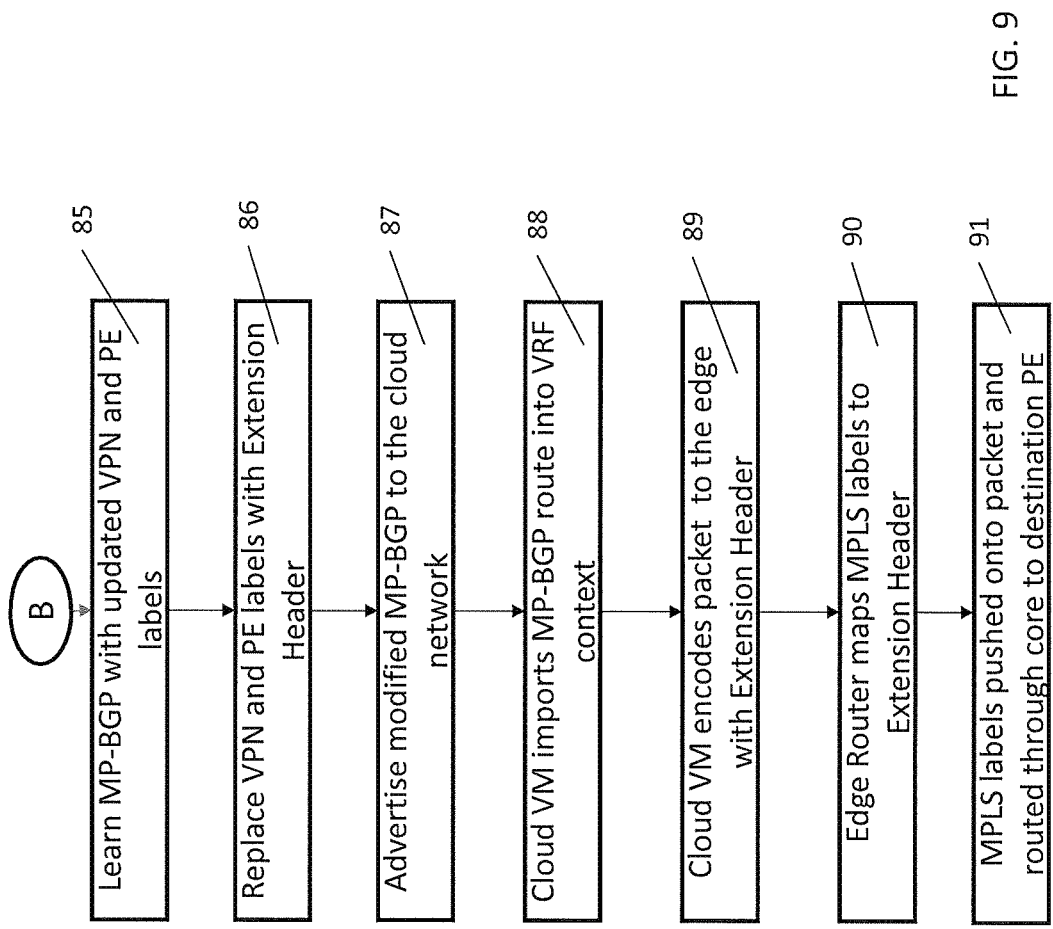
FIG. 9 is a continuation of the exemplary method shown in FIG. 8.

With reference to FIGS. 8 and 9, there is shown an exemplary process flow 80 that describes the interaction between a provider network and a cloud network. At 81, an MP-BGP session between the cloud network 25 and the provider network 11 is established using IPv6 protocol. At 82, the provider network 11 and cloud network 25 exchange control plane updates. At 83, the provider element running MPLS sends MP-BGP updates to the provider edge router 23. At 84, the cloud edge processor 24 processes paths received from the provider edge router 23.

The process continues at B on FIG. 9 which describes an exemplary process by which the cloud edge processor 24 may process the paths received from the provider edge router 23. At 85, the provider edge processor 24 learns the MP-BGP with updated VPN and PE labels. At 86, the VPN and PE labels are replaced with an extension header. At 87, the modified MP-BGP is advertised to the cloud edge router 24. At 88, the cloud VM 26 imports the MP-BGP route into the VRF context. The cloud VM 26 encodes packet to the cloud edge router 24 with the extension header at 89. At 90, the provider edge router 23 maps MPLS labels to the extension header received from the cloud edge router 24. At 91, the MPLS labels are pushed onto the packet and routed through the core of the provider network to the remote processing element 21.

This solution changes how providers efficiently and seamlessly connect to cloud networks in order to provider higher resiliency, dynamic failover, and native MPLS functions all the way to VM instantiated and running in the cloud network. The benefits include dynamic VM relocation without the need for edge router provisioning, removal of service instances from edge routers that connect to the cloud, and there are no changes required on existing legacy, or remote PEs, in the provider network. As such, the practical application permits VMs to seamless move between cloud providers and telecommunications service providers.

Figure 10:
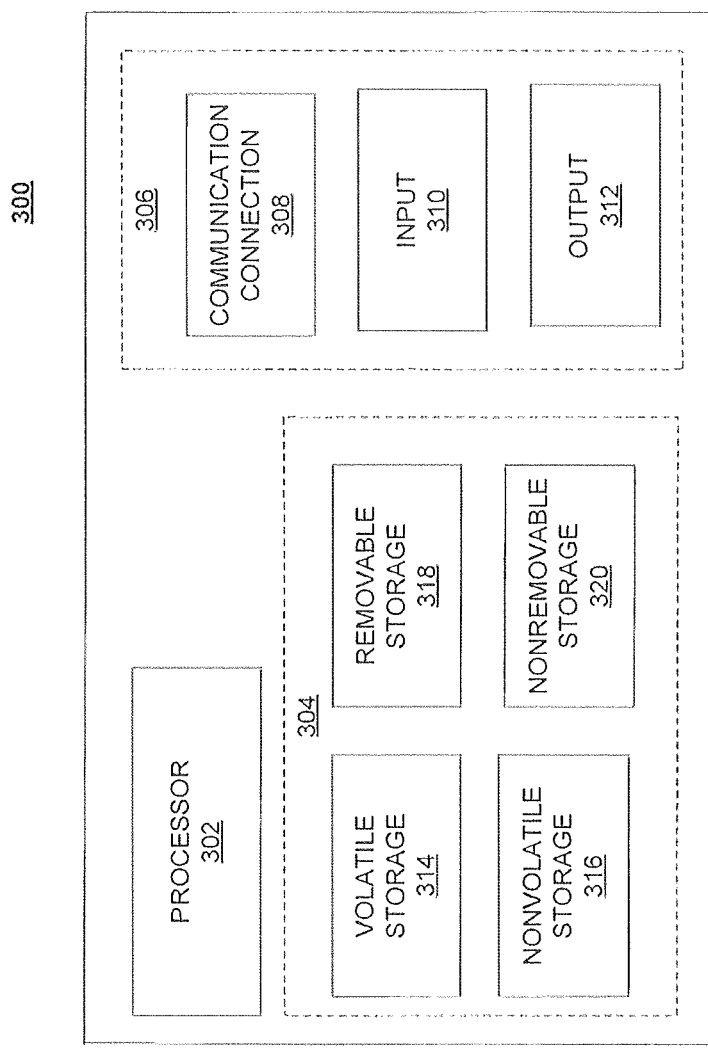
FIG. 10 illustrates a schematic of an exemplary network device.

Network Description. FIG. 10 is a block diagram of network device 300 that may be connected to the network described in FIG. 1 or which may be a component of such a network. Network device 300 may comprise hardware or a combination of hardware and software. The functionality to facilitate telecommunications via a telecommunications network may reside in one or combination of network devices 300. Network device 300 depicted in FIG. 10 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 10 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 10) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communication (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 11:
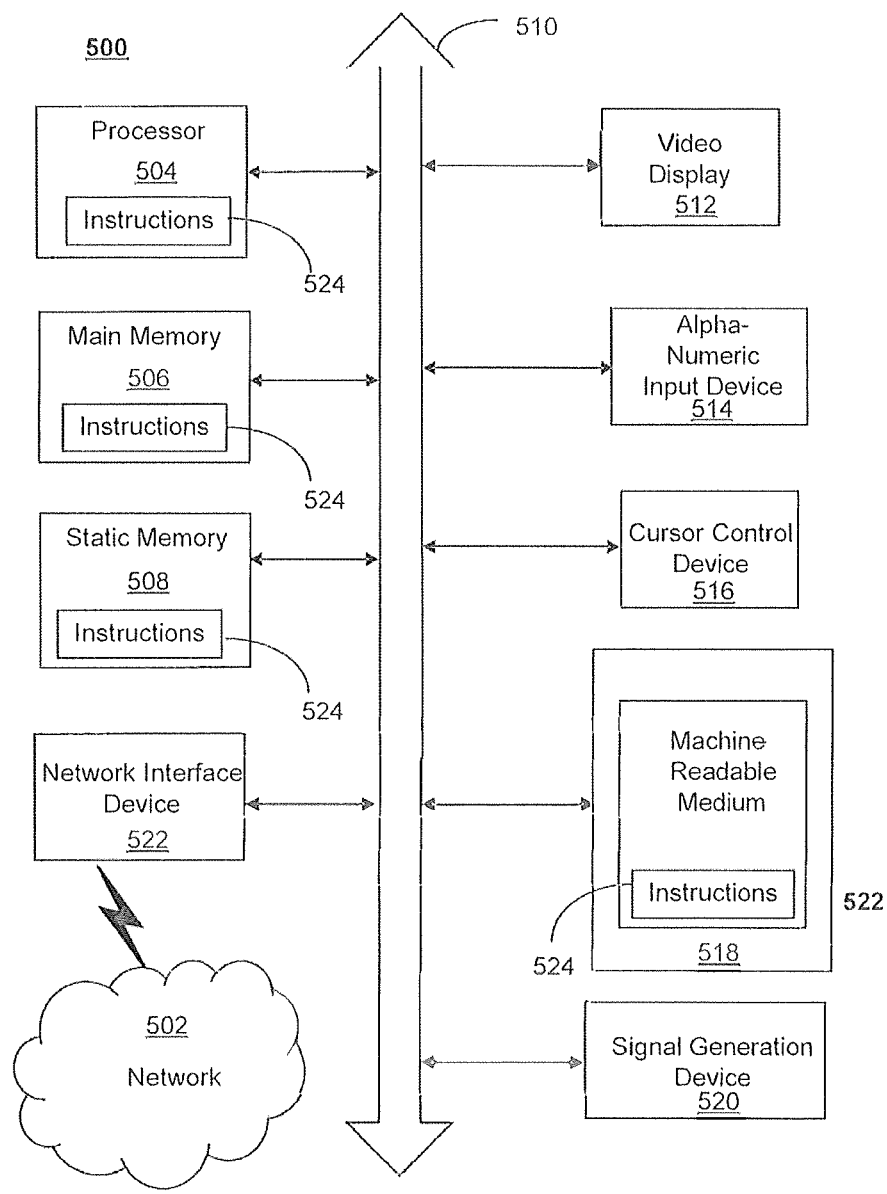
FIG. 11 illustrates an exemplary communication system that provides wireless telecommunication services over wireless communication networks.

FIG. 11 depicts an exemplary diagrammatic representation of a machine in the form of a computer system 500 within which a set of instructions, when executed, may cause the machine to perform any one or more of the methods described above. One or more instances of the machine can operate, for example, as processor 302, server 112, mobile device 101, in 102, MME 103, and other devices of FIG. 1 and FIG. 2. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, internet of things (IOT) device (e.g., thermostat, sensor, or other machine-to-machine device), or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 12:
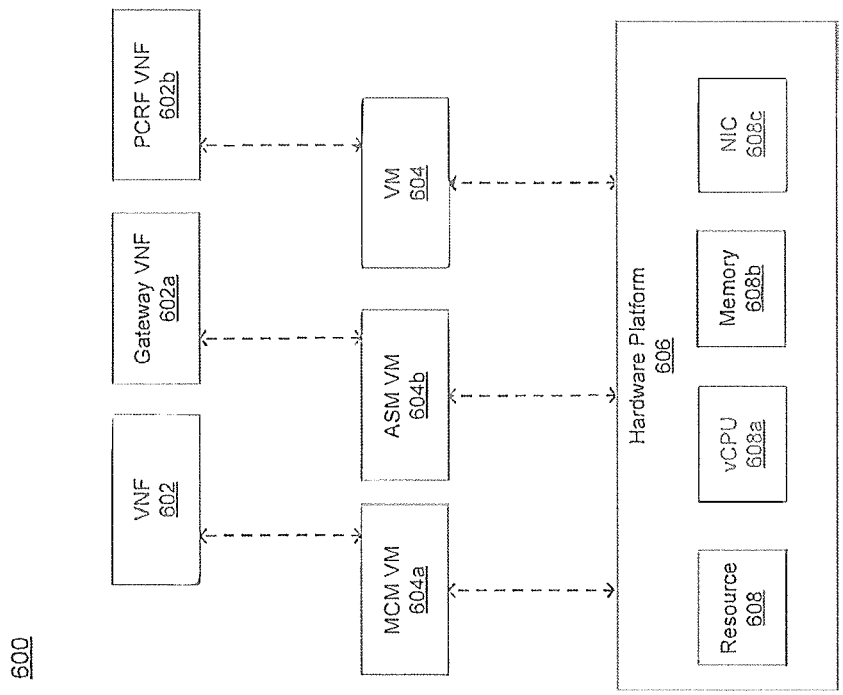
FIG. 12 is a representation of an exemplary network.

FIG. 12 is a representation of an exemplary network 600. Network 600 (e.g., network 111) may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 12 illustrates a gateway VNF 602*a* and a policy and charging rules function (PCRF) VNF 602*b*. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 12 illustrates a management control module (MCM) VM 604*a*, an advanced services module (ASM) VM 604*b*, and a DEP VM 604*c*. Additionally or alternatively, VMs 604 may include other types of VMs. Each VM 604 may consume various network resources from a hardware platform 606, such as a resource 608, a virtual central processing unit (vCPU) 608*a*, memory 608*b*, or a network interface card (NIC) 608*c*. Additionally or alternatively, hardware platform 606 may include other types of resources 608.

Figure 13:
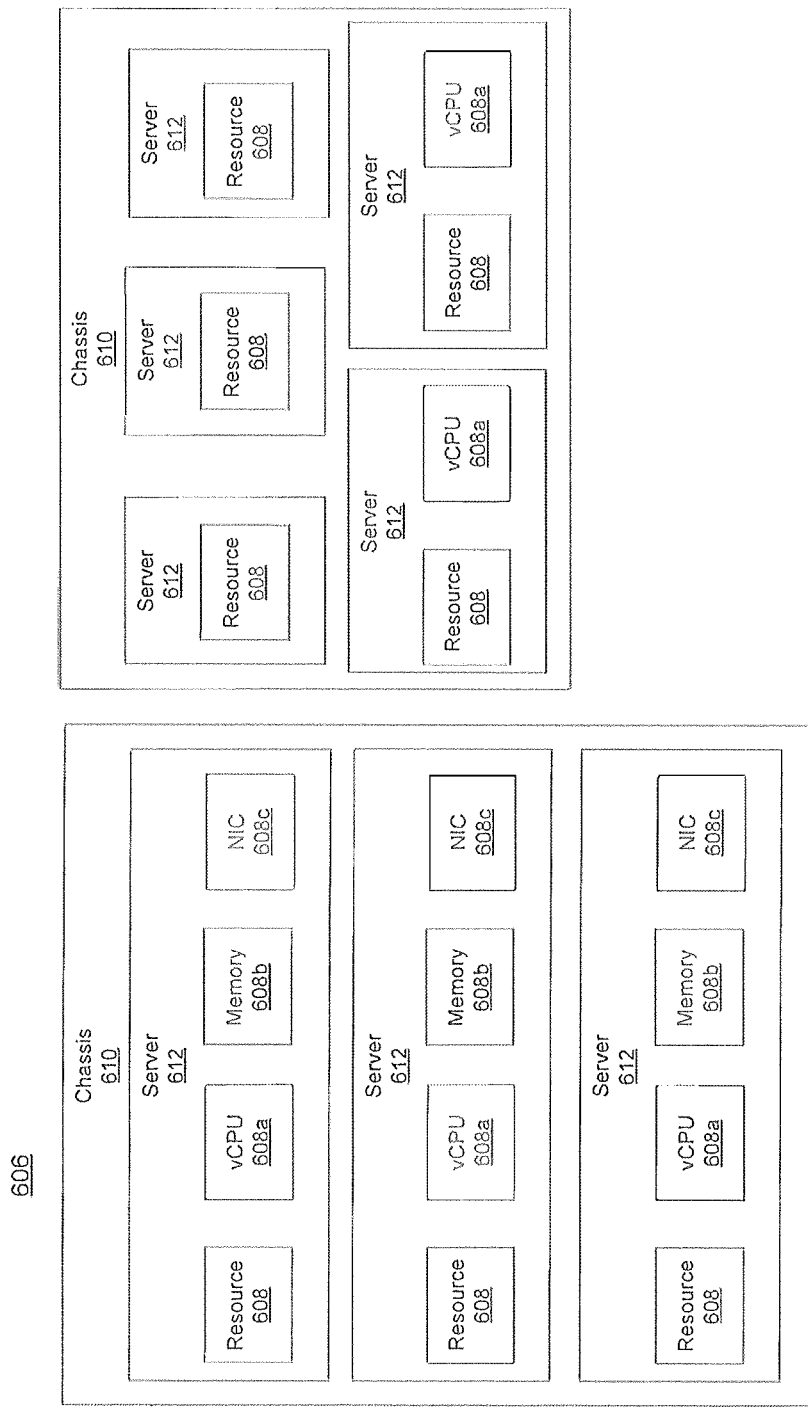
FIG. 13 is a representation of an exemplary hardware platform for a network.

While FIG. 12 illustrates resources 608 as collectively contained in hardware platform 606, the configuration of hardware platform 606 may isolate, for example, certain memory 608*c* from other memory 608*c*. FIG. 13 provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally, or alternatively, chasses 610 may be communicatively coupled together (not shown) in any combination or arrangement.

The characteristics of each chassis 610 and each server 612 may differ. For example, FIG. 13 illustrates that the number of servers 612 within two chasses 610 may vary. Additionally, or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally, or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have sufficient resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope of the disclosed subject matter is defined by the claims and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
    sending a request from a remote Virtual Machine (VM) in an external cloud network to a multi-protocol label switching (MPLS) network, wherein the request is for services provided by a remote processor in the MPLS network, wherein the external cloud network does not support MPLS;
    extending a multi-protocol border gateway protocol (MP-BGP) session between an MPLS edge processor of the MPLS network to a cloud edge processor of the external cloud network;
    exchanging control plane updates between the MPLS network and the external cloud network, wherein the control plane updates include a mapping of a MPLS label for the services to an extension header, wherein the cloud edge processor provides the extension header for the services to the remote VM;
    and
    processing paths between the MPLS network and the remote VM.

2. The method of claim 1 wherein the processing of the paths comprises:
    receiving route information for the MP-BGP session into a virtual routing and forwarding (VRF) context, wherein the route information has the extension header appended thereto;
    encoding a data packet with the extension header appended thereto;
    mapping the extension header to the MPLS label;
    routing the data packet to the remote processor providing the services in the MPLS network in accordance with the MPLS label.

3. The method of claim 2 wherein extending the MP-BGP session comprises the MPLS edge processor advertising a MP-BGP update to the cloud edge processor with a destination of the remote VM having the VRF context.

4. The method of claim 3 wherein the receiving the route information is based on receipt of an advertisement published by the MPLS edge processor.

5. The method of claim 3 wherein the mapping of the extension header to the MPLS label is accessible by the MPLS edge processor.

6. A method comprising:
receiving, at a multi-protocol label switching (MPLS) network, a request from a Virtual Machine (VM) in an external cloud network, wherein the external cloud network does not support MPLS, wherein the request is for services provided by a remote processor in the MPLS network;
extending a multi-protocol border gateway protocol (MP-BGP) session between an MPLS edge processor of the MPLS network to a cloud edge processor of the external cloud network;
exchanging control plane updates between the MPLS network and the external cloud network, wherein the cloud edge processor provides an extension header for the services to the VM;
sending MP-BGP session updates and next hop routing information to the MPLS edge processor in the MPLS network; and
advertising the MP-BGP session updates to the external cloud network.

7. The method of claim 6 wherein the control plane updates comprises replacing an MPLS label with the extension header to form a modified MP-BGP header.

8. The method of claim 7 further comprising maintaining a correlation map between the MPLS label and the extension header.

9. The method of claim 8 further comprising:
receiving data associated with the extension header from the VM at the MPLS edge processor;
replacing the extension header with the MPLS label; and
routing the data to a remote processing element in the MPLS network based on the MPLS label.

10. The method of claim 9 further comprising:
receiving data from the remote processing element at the MPLS edge processor;
replacing the MPLS label with the extension header; and
advertising the modified MP-BGP header to a cloud edge router in the external cloud network for routing to the VM.

11. The method of claim 6 wherein the MP-BGP session updates are sent from a remote processing element in the MPLS network to the MPLS edge processor.

12. The method of claim 11 further comprising sending internet protocol version 6 (IPv6) updates from the MPLS edge processor to the VM.

13. The method of claim 6 further comprising establishing a non-MPLS connection between the MPLS edge processor and a cloud edge router associated with the external cloud network.

14. A system comprising:
a multi-protocol label switching (MPLS) network having a remote processing element;
an MPLS network edge processor in communication with the remote processing element, wherein the MPLS network edge processor has an input-output interface;
a processor coupled to the input-output interface wherein the MPLS network edge processor is further coupled to a memory, the memory having stored thereon executable instructions that, when executed by the MPLS network edge processor, cause the MPLS network edge processor to effectuate operations comprising:
receiving a request from a Virtual Machine (VM) in an external cloud network, wherein the external cloud network does not support MPLS, wherein the request is for services provided by a remote processor in the MPLS network;
extending a multi-protocol border gateway protocol (MP-BGP) session between a MPLS edge processor in the MPLS network to a cloud edge processor of the external cloud network;
exchanging control plane updates between the MPLS network and the external cloud network, wherein the cloud edge processor provides an extension header for the services to the VM;
sending MP-BGP session updates to the MPLS edge processor in the MPLS network along with next hop routing information; and
advertising the MP-BGP session updates to the cloud edge processor in the external cloud network.

15. The system of claim 14 wherein the operations further comprise:
replacing an MPLS label with the extension header;
receiving data associated with the extension header from the VM;
replacing the extension header with the MPLS label; and
routing the data to the remote processing element.

16. The system of claim 14 wherein the operations further comprise:
receiving data from the remote processing element;
replacing an MPLS label with the extension header; and
advertising a modified MP-BGP header to a cloud edge router in the external cloud network for routing the data to the VM.

17. The system of claim 14 wherein the operations further comprise receiving the MP-BGP session updates from a virtual routing and forwarding (VRF) context from the remote processing element.

18. The system of claim 14 wherein the operations further comprise sending internet protocol version 6 (IPv6) updates to the VM.

19. The system of claim 14 wherein the operations further comprise establishing a non-MPLS connection with a cloud edge router associated with the external cloud network.

20. The system of claim 15, wherein the operations further comprise maintaining a correlation map between the MPLS label and the extension header.

* * * * *